(12) United States Patent
Griffin

(10) Patent No.: US 7,481,245 B1
(45) Date of Patent: Jan. 27, 2009

(54) PLUMBING END CAP

(76) Inventor: William C. Griffin, 5913 Edrene Ave., Las Vegas, NV (US) 89108

(*) Notice: Subject to any disclaimer, the term of this patent is extended or adjusted under 35 U.S.C. 154(b) by 0 days.

(21) Appl. No.: 11/963,979

(22) Filed: Dec. 24, 2007

(51) Int. Cl.
*F16L 55/10* (2006.01)

(52) U.S. Cl. .................. 138/96 R; 138/96 T; 138/89.3; 220/203.04; 220/203.29; 220/231; 251/354; 215/262

(58) Field of Classification Search ............. 138/96 R, 138/96 T, 89.1–89.4, 90; 220/203.04, 203.07, 220/203.09, 203.29, 231; 215/262; 251/354
See application file for complete search history.

(56) References Cited

U.S. PATENT DOCUMENTS

| | | | | |
|---|---|---|---|---|
| 2,591,562 A | * | 4/1952 | Levell | 220/231 |
| 3,294,118 A | * | 12/1966 | Wieden et al. | 137/588 |
| 3,415,410 A | * | 12/1968 | Franchini | 220/203.29 |
| 4,249,670 A | | 2/1981 | Hug | 220/295 |
| 4,392,872 A | | 7/1983 | Hall et al. | 5/673 |
| 4,429,719 A | * | 2/1984 | Mosing | 138/96 T |
| 4,430,887 A | | 2/1984 | Roberts et al. | 73/49.5 |
| 4,466,550 A | * | 8/1984 | Sullivan | 220/203.07 |
| 4,736,863 A | * | 4/1988 | Harris | 220/203.21 |
| D321,241 S | | 10/1991 | Ingle | D23/235 |
| 5,915,418 A | * | 6/1999 | Turner | 138/89 |
| 6,089,256 A | * | 7/2000 | Warby | 137/375 |
| 6,375,024 B1 | * | 4/2002 | Park | 215/262 |
| 6,408,887 B2 | * | 6/2002 | Rahimzadeh et al. | 138/96 R |
| 6,880,733 B2 | * | 4/2005 | Park | 222/397 |
| 7,025,079 B1 | | 4/2006 | Elnar | 137/199 |
| 2002/0166859 A1 | | 11/2002 | McGrew, Jr. | 220/366.1 |

* cited by examiner

*Primary Examiner*—Patrick F Brinson
(74) *Attorney, Agent, or Firm*—Crossley Patent Law; Mark A. Crossley

(57) ABSTRACT

A plumbing end cap that is designed to assist a plumber in removing the air in an underground piping system just prior to testing the system with water. The end cap includes a small valve stem that is fixedly attached to the end cap prior to the end cap being attached to the terminal end of an open pipe. The end cap allows a plumber to eliminate the need to retest a closed system for leaks in the event the water level drops during such a test, due to air remaining in the closed system.

1 Claim, 5 Drawing Sheets

PLUMBING END CAP

BACKGROUND OF THE INVENTION

The present invention concerns that of a new and improved plumbing end cap that is designed to assist a plumber in removing the air in an underground piping system just prior to testing the system with water.

SUMMARY OF THE INVENTION

The present invention concerns that of a new and improved plumbing end cap that is designed to assist a plumber in removing the air in an underground piping system just prior to testing the system with water. The end cap includes a small valve stem that is fixedly attached to the end cap prior to the end cap being attached to the terminal end of an open pipe. The end cap allows a plumber to eliminate the need to retest a closed system for leaks in the event the water level drops during such a test, due to air remaining in the closed system.

There has thus been outlined, rather broadly, the more important features of a plumbing end cap that the detailed description thereof that follows may be better understood and in order that the present contribution to the art may be better appreciated. There are, of course, additional features of the plumbing end cap that will be described hereinafter and which will form the subject matter of the claims appended hereto.

In this respect, before explaining at least one embodiment of the plumbing end cap in detail, it is to be understood that the plumbing end cap is not limited in its application to the details of construction and to the arrangements of the components set forth in the following description or illustrated in the drawings. The plumping end cap is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the plumbing end cap. It is important, therefore, that the claims be regarded as including such equivalent constructions insofar as they do not depart from the spirit and scope of the present invention.

It is therefore an object of the present invention to provide a plumbing end cap which has all of the advantages of the prior art and none of the disadvantages.

It is another object of the present invention to provide a plumbing end cap which may be easily and efficiently manufactured and marketed.

It is another object of the present invention to provide a plumbing end cap which is of durable and reliable construction.

It is yet another object of the present invention to provide a plumbing end cap which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
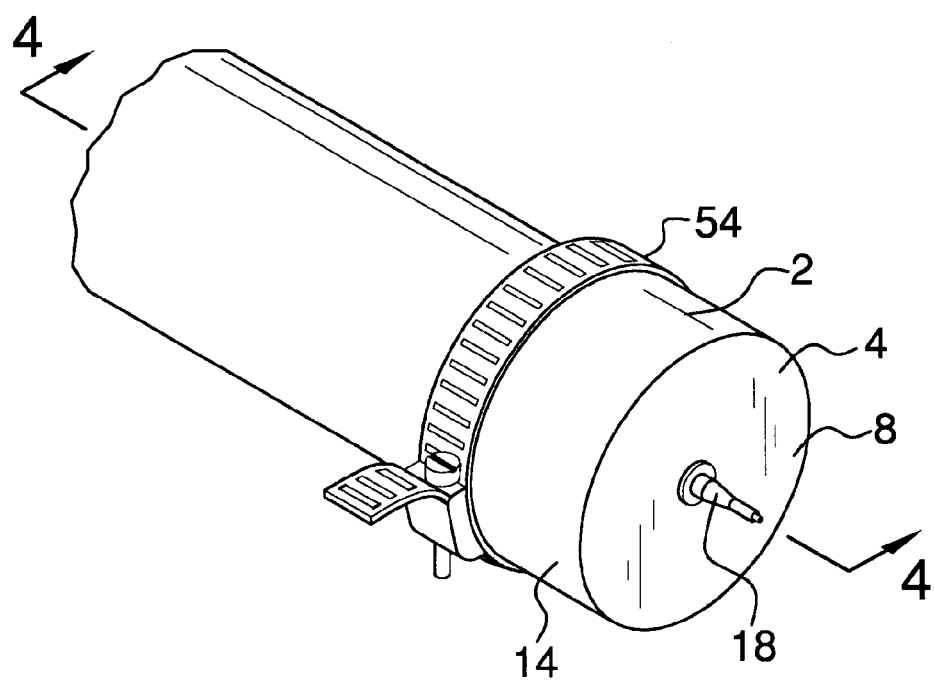
FIG. 1 shows a front perspective view of the plumbing end cap as it would appear in use.
Figure 2A:
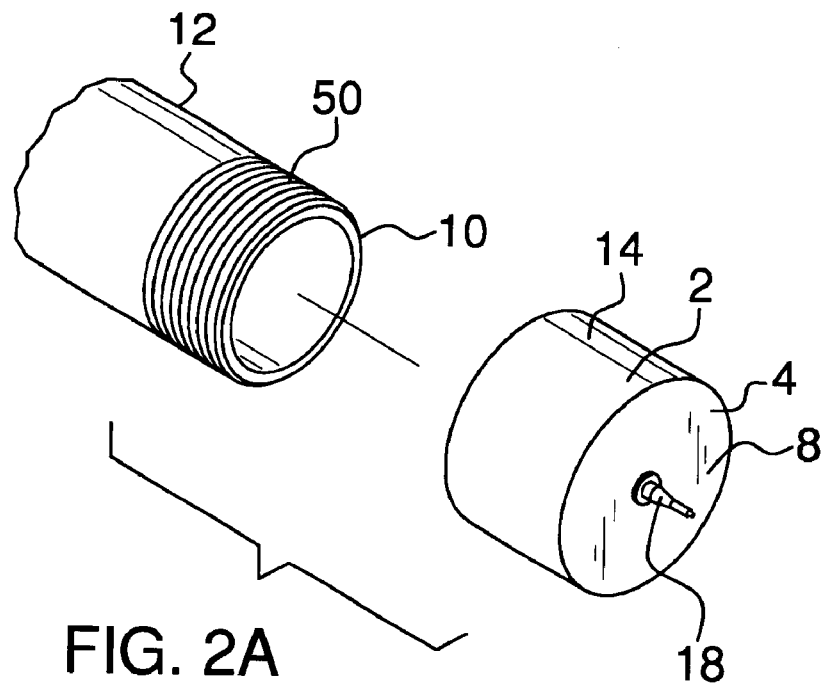
FIG. 2A shows a front perspective view of the preferred embodiment of the plumbing end cap as it is being attached to the terminal end of an open pipe.
Figure 2B:
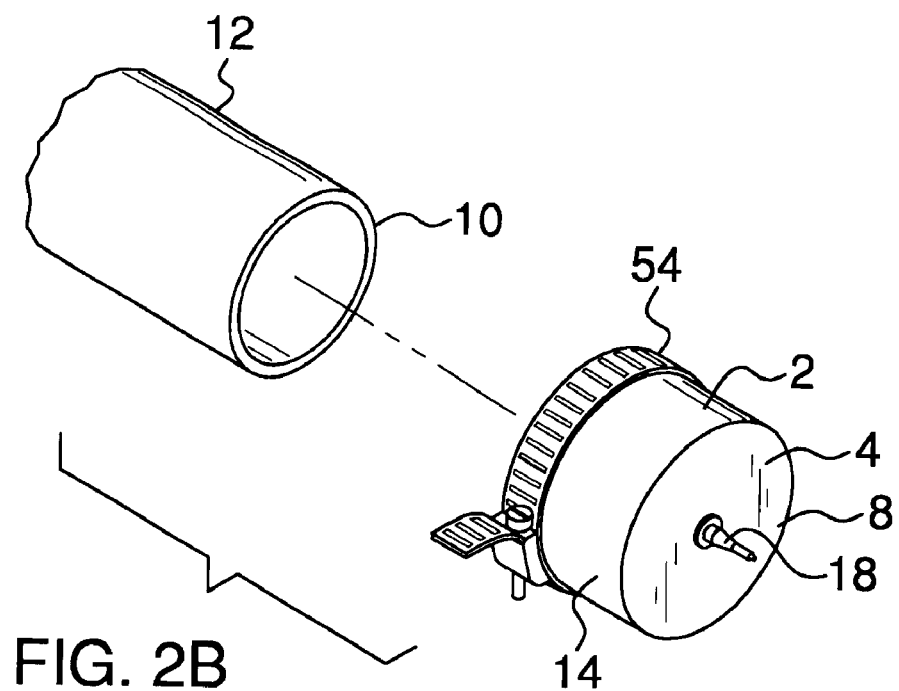
FIG. 2B shows a front perspective view of an alternative embodiment of the plumbing end cap as it is being attached to the terminal end of an open pipe.
Figure 3:
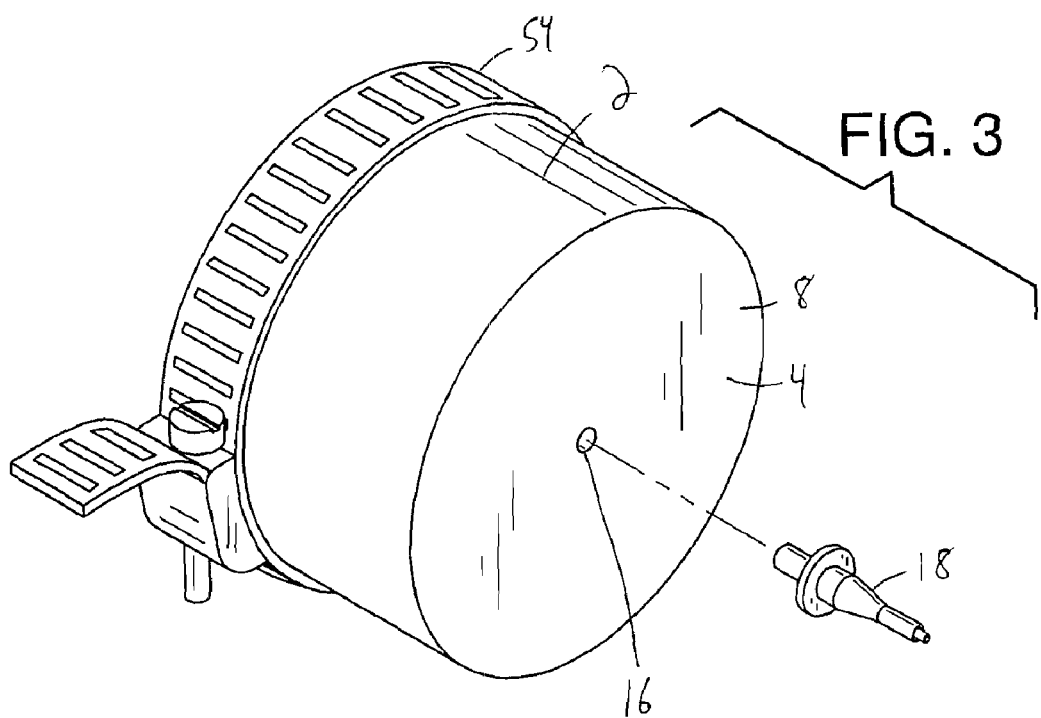
FIG. 3 shows a perspective view of the alternative embodiment of the plumbing end cap.
Figure 4:
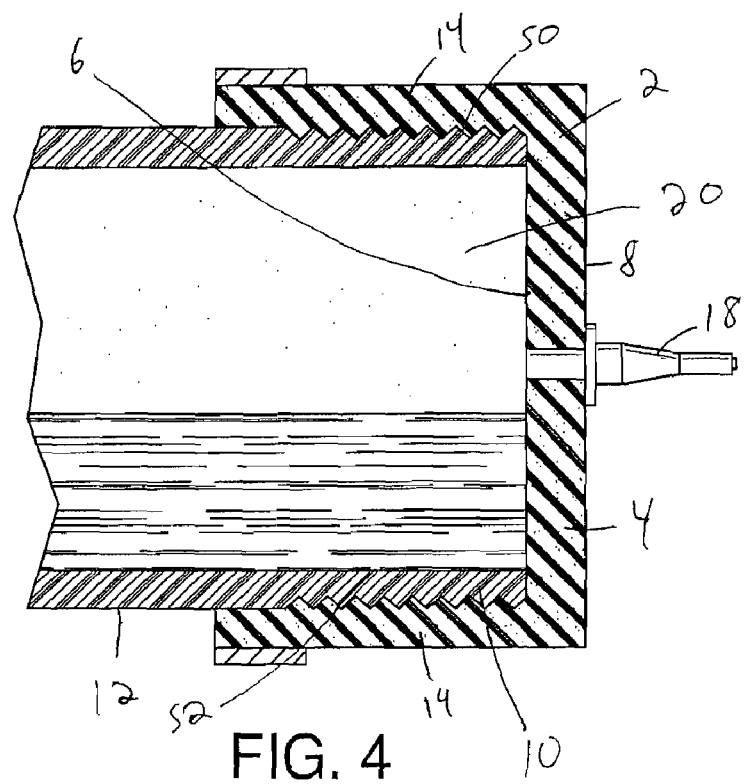
FIG. 4 shows a side view of the preferred embodiment of the plumbing end cap as it is shown attached to the terminal end of an open pipe.
Figure 5:
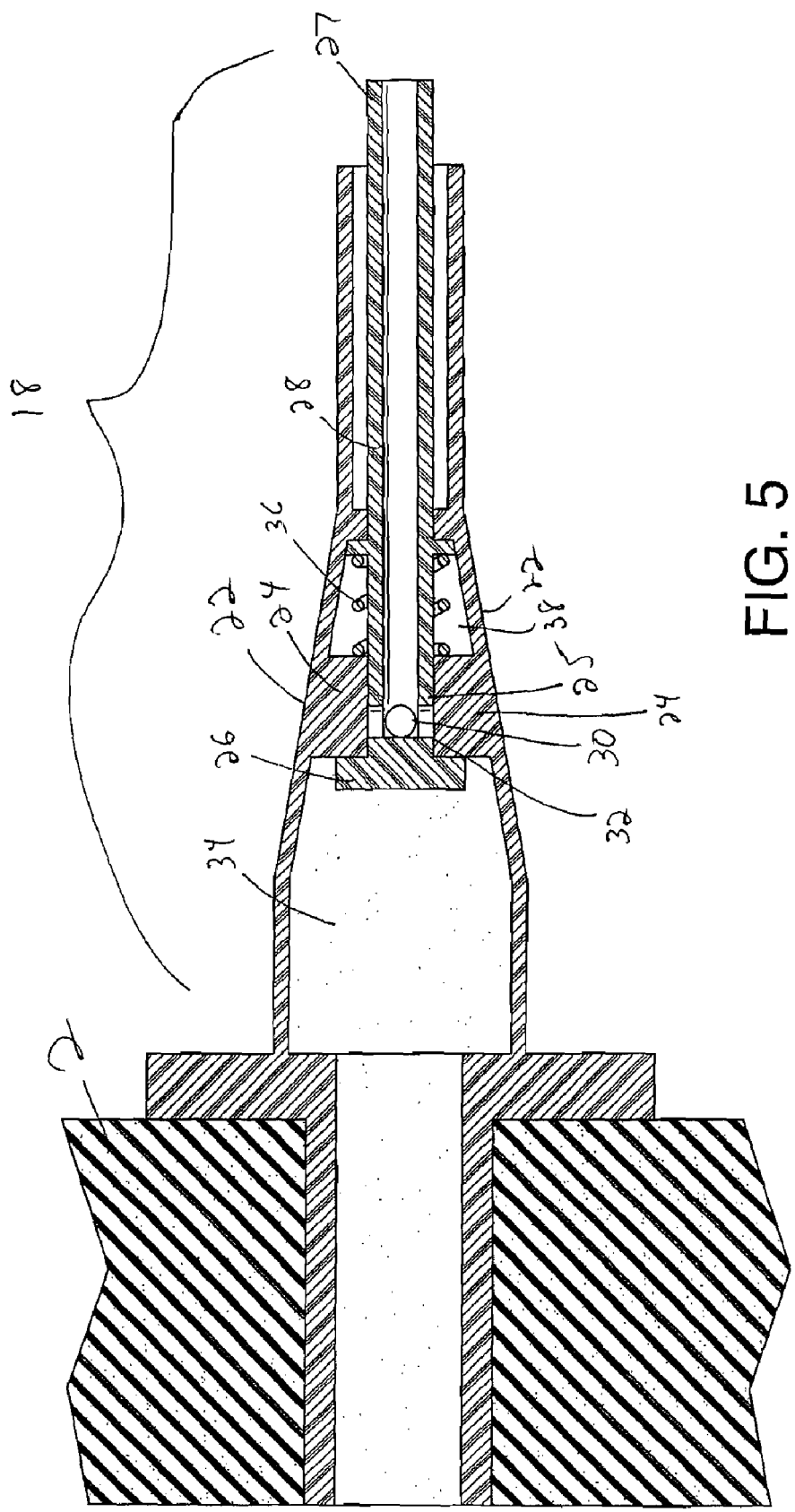
FIG. 5 shows a cutaway view of the valve stem attached to the plumbing end cap as it is shown in a closed position.
Figure 6:
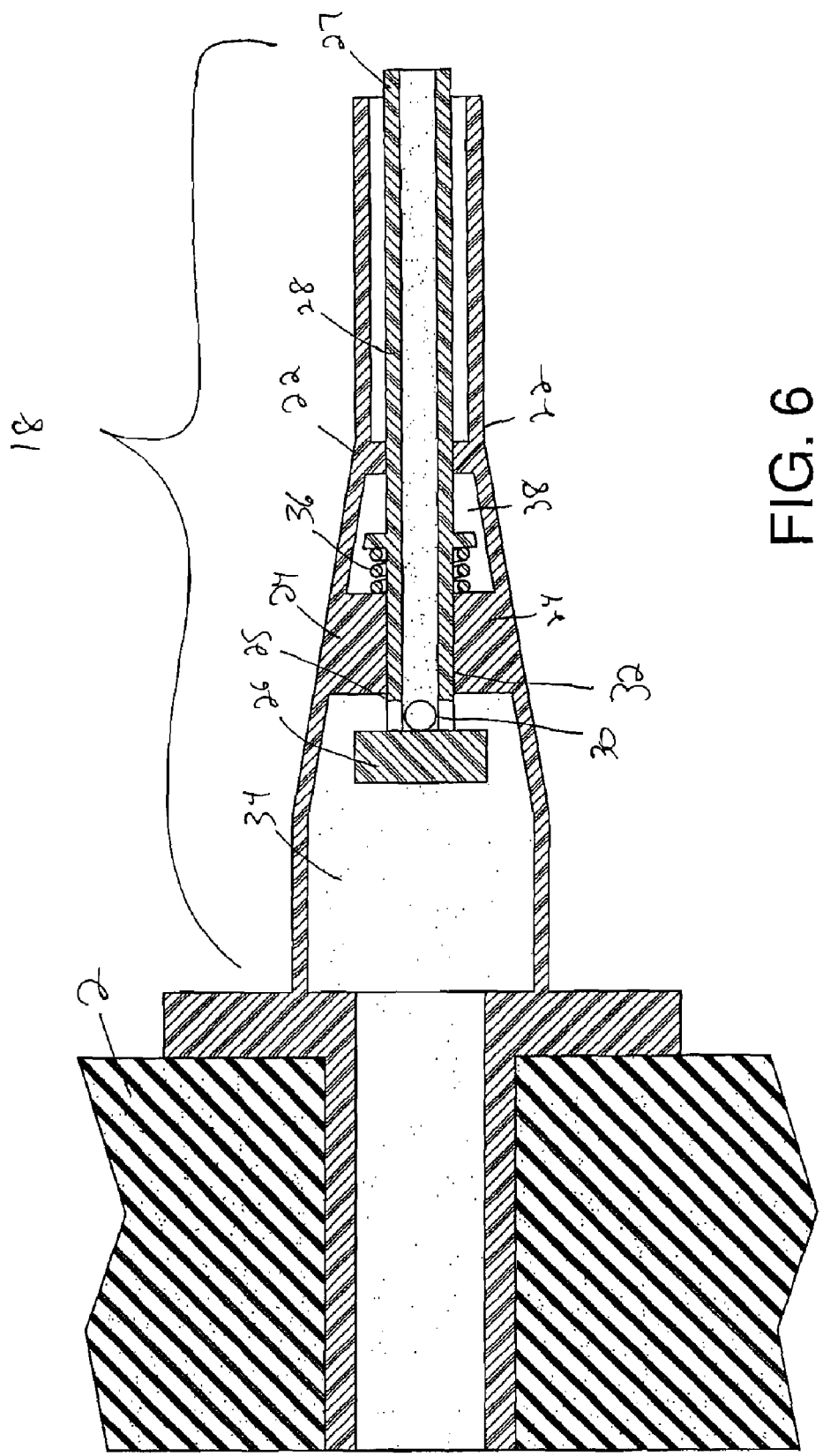
FIG. 6 shows a cutaway view of the valve stem attached to the plumbing end cap as it is shown in an open position.

With reference now to the drawings, and in particular to FIGS. 1 through 6 thereof, a new plumbing end cap 2 embodying the principles and concepts of the present invention and generally designated by the reference numeral 2 will be described.

As best illustrated in FIGS. 1 through 6, the plumbing end cap 2 comprises a base 4 that has two surfaces comprising an inner surface 6 and an outer surface 8. The base 4 is disc-shaped so that it can fit over the terminal end 10 of a length of pipe 12.

The plumbing end cap 2 has a continuous side surfacer 14 attached to the inner surface 6 of the base 4. This continuous side surface 14 is placed over the terminal end 10 of the length of pipe 12 when the plumbing end cap 2 is in use.

The base 4 has a centrally-located hole 16 on it and has a valve stem 18 inserted into the hole 16. The valve stem 18 extends beyond the outer surface 8 of the base 4 and is designed to remove air 20 from within the length of pipe 12 when the end plumbing end cap 2 is in place.

The valve stem 18 includes an outer casing 22, an inner set block 24, an inner base 26, a cylindrical stem 28, and at least one air outlet hole 30 located on the cylindrical stem 28 immediately adjacent to the inner base 26. The outer casing 22 of the valve stem 18 is attached to the base 4. The cylindrical stem 28 is attached to the inner base 26 and has two ends comprising an inner end 25 and an outer end 27, with the inner end 25 of the cylindrical stem 28 being attached to the inner base 26. The outer end 27 of the cylindrical stem 28 extends a little bit outside of the outer casing 22, while a portion of the cylindrical stem 28 near the inner end 25 of the stem 28 passes through a hole 32 in the inner set block 24 before it is connected to the inner base 26, which is located within a primary compartment 34 within the valve stem 18. A spring 36 surrounds the cylindrical stem 28 and is attached to the cylindrical stem 28 within a spring compartment 38 that is located within the valve stem 18.

The area within the primary compartment 34 is contiguous with the area within the length of pipe 12. When the pressure is normal within the length of pipe or the valve stem 18 is not manually activated, the valve stem 18 is in a closed position.

In this position, the inner base 26 is flush against the inner set block 24, causing each air outlet hole 30 to be located within the hole 32 on the inner set block 24. In this position, air and/or water within the valve stem 18 would not have access to the air outlet hole 30, and therefore, could not enter the cylindrical stem 28 to eventually exit the outer end 27 of the cylindrical stem 28. Furthermore, in this position, the spring 36 surrounding the cylindrical stem 28 would be fully extended and thereby would not be putting any pressure against the cylindrical stem 28.

When the pressure within the length of pipe 12 of the valve stem 18 would becomes too great or when the cylindrical stem 28 is manually pushed in, the inner base 28 is pushed further into the primary compartment 34, thereby exposing each air outlet hole 30 on the cylindrical stem 28 to the air within the valve stem 18. This causes air to be forced through each air outlet hole 30, where it travels through the cylindrical stem 28 and exits through the outer end 27 of the cylindrical stem 28. In this "open" position, the spring 36 within the spring compartment 38 is in a compressed state, thereby allowing the spring 36 to force the cylindrical stem 28 back into a "closed" position when either the cylindrical stem 28 is no longer being manually activated or when the pressure within the length of pipe 12 and valve stem 18 is lessened.

The plumbing end cap 2 can be attached to the length of pipe 12 with two different methods. In the preferred embodiment, the length of pipe 12 has a plurality of external threads 50, while the continuous side surface 14 has a plurality of internal threads 52. In this manner, the plurality of external threads 50 on the length of pipe 12 can be threadably attached to the plurality of internal threads 52 on the continuous side surface 14.

In the alternative embodiment, the continuous side surface 14 of the plumbing end cap 2 is merely slid over the length of pipe 12. An adjustable band 54, which previously would have been placed around the continuous side surface 14 of the plumbing end cap 2, is then tightened so that the connection between the plumbing end cap 2 and the length of pipe 12 is sealed.

With respect to the above description then, it is to be realized that the optimum dimensional relationship for the parts of the present vehicle air freshener device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What I claim as my invention is:

1. A threaded plumbing end cap in combination with a length of pipe, the plumbing end cap comprising
   a base, the base having two surfaces comprising an inner surface and an outer surface,
   a continuous side surface attached to the inner surface of the base,
   means for attaching the plumbing end cap to the length of pipe comprising
      a plurality of external threads located on the length of pipe,
      a plurality of internal threads located on the continuous side surface,
      wherein the plurality of external threads located on the length of pipe can be threadably attached to the plurality of internal threads located on the continuous side surface,
      an adjustable band placed around the continuous side surface,
      wherein the continuous side surface is slide over the length of pipe,
      further wherein the adjustable band is tightened,
      a plurality of external threads located on the length of pipe,
   means for releasing any extra air within the length of pipe once the plumbing end cap is attached to the length of pipe comprising:
      a hole located on the base,
      a valve stem inserted into the hole located on the base comprising
         an outer casing, the outer casing being attached to the base,
         an inner set block located within the outer casing, the inner set block including a hole,
         a primary compartment located within the outer casing, the primary compartment being contiguous with the area within the length of pipe,
         an inner base located within the primary compartment, the inner base normally being flush against the inner set block,
         a cylindrical stem having two ends comprising an inner end and an outer end, the inner end of the cylindrical stem being connected to the inner base, the outer end of the cylindrical stem slightly extending outside the outer casing,
         a spring compartment located within the outer casing, and
         a spring located within the spring compartment, the spring being attached to the cylindrical stem,
         at least one air outlet hole located on the inner end of the cylindrical stem,
         wherein the air outlet hole is normally located within the hole located in the inner base within the valve stem, and
         wherein the cylindrical stem may be manually pushed inwardly to allow the air outlet hole to enter the primary chamber comprising a large amount of air pressure within the length of pipe, wherein said pushing causes the inner base to push away slightly from the set block, thereby allowing the air outlet hole to enter the primary chamber,
         wherein the valve stem releases any extra air within the length of pipe once pressure within the length of pipe reaches a specific level.

* * * * *